US010587157B2

(12) United States Patent
Miyoshi et al.

(10) Patent No.: US 10,587,157 B2
(45) Date of Patent: Mar. 10, 2020

(54) STATOR FOR ROTATING ELECTRICAL MACHINE

(71) Applicant: AISIN AW CO., LTD., Anjo-shi, Aichi-ken (JP)

(72) Inventors: Yoichi Miyoshi, Okazaki (JP); Junichi Yokota, Nagoya (JP); Kiyotaka Koga, Nishio (JP); Junichi Sugawara, Okazaki (JP); Hideaki Kimura, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 135 days.

(21) Appl. No.: 15/576,182

(22) PCT Filed: May 30, 2016

(86) PCT No.: PCT/JP2016/065887
§ 371 (c)(1),
(2) Date: Nov. 21, 2017

(87) PCT Pub. No.: WO2017/006645
PCT Pub. Date: Jan. 12, 2017

(65) Prior Publication Data
US 2018/0205271 A1    Jul. 19, 2018

(30) Foreign Application Priority Data
Jul. 6, 2015  (JP) .................................. 2015-135526

(51) Int. Cl.
*H02K 1/27* (2006.01)
*H02K 1/14* (2006.01)
(Continued)

(52) U.S. Cl.
CPC ............. *H02K 1/148* (2013.01); *H02K 1/141* (2013.01); *H02K 1/165* (2013.01); *H02K 1/2733* (2013.01);
(Continued)

(58) Field of Classification Search
CPC .. H02K 1/14; H02K 1/16; H02K 1/27; H02K 15/02; H02K 15/04; H02K 15/06;
(Continued)

(56) References Cited

U.S. PATENT DOCUMENTS 6,366,000 B1 * 4/2002 Higashino ................ H02K 3/12
310/208
6,462,453 B1    10/2002 Asao et al.
(Continued)

FOREIGN PATENT DOCUMENTS

JP    S61-173651 A    8/1986
JP    H9-215244 A    8/1997
(Continued)

OTHER PUBLICATIONS

JP-2013115832-A machine translation Jun. 22, 2019.*
Jul. 26, 2016 Search Report issued in International Patent Application No. PCT/JP2016/065887.

*Primary Examiner* — Quyen P Leung
*Assistant Examiner* — Leda T Pham
(74) *Attorney, Agent, or Firm* — Oliff PLC

(57) ABSTRACT

A stator for a rotating electrical machine, the stator including a tubular core having a plurality of slots; and a coil mounted in the core, wherein the coil includes a plurality of conductor wires aligned in the slots, each of the conductor wires has ends projecting beyond the slot, a pair of the ends are bonded together to form a bonded end, a plurality of the bonded ends are arranged next to each other in a circumferential direction of the core and are arranged in a radial pattern so as to extend in a radial direction of the core, and a cap is formed by molding using a resin material having electrical insulation properties so that the cap integrally covers adjacent ones of the plurality of bonded ends.

8 Claims, 7 Drawing Sheets

(51) Int. Cl.
| | |
|---|---|
| *H02K 3/38* | (2006.01) |
| *H02K 1/16* | (2006.01) |
| *H02K 3/18* | (2006.01) |
| *H02K 3/52* | (2006.01) |
| *H02K 15/02* | (2006.01) |
| *H02K 15/04* | (2006.01) |
| *H02K 15/06* | (2006.01) |
| *H02K 15/08* | (2006.01) |

(52) U.S. Cl.
CPC ............ *H02K 3/18* (2013.01); *H02K 3/38* (2013.01); *H02K 3/522* (2013.01); *H02K 15/022* (2013.01); *H02K 15/0435* (2013.01); *H02K 15/067* (2013.01); *H02K 15/08* (2013.01)

(58) Field of Classification Search
CPC .......... H02K 3/38; H02K 3/52; H02K 15/067; H02K 15/0435; H02K 15/022; H02K 3/522; H02K 3/18; H02K 1/2733; H02K 1/165; H02K 1/148; H02K 1/141; H02K 15/08; H02K 3/32; H02K 3/50; H02K 3/12; H02K 3/28

See application file for complete search history.

(56) References Cited

U.S. PATENT DOCUMENTS

| | | | |
|---|---|---|---|
| 9,312,735 B2 * | 4/2016 | Takasaki | H02K 3/38 |
| 2004/0145257 A1 * | 7/2004 | Oohashi | H02K 3/38 310/71 |
| 2011/0012450 A1 * | 1/2011 | Umeda | H02K 3/12 310/71 |

FOREIGN PATENT DOCUMENTS

| | | | |
|---|---|---|---|
| JP | 2000-209802 A | | 7/2000 |
| JP | 2001-238419 A | | 8/2001 |
| JP | 2008-136342 A | | 6/2008 |
| JP | 2011-142747 A | | 7/2011 |
| JP | 2013-115832 A | | 6/2013 |
| JP | 2013115832 A | * | 6/2013 |
| JP | 2013-207912 A | | 10/2013 |

* cited by examiner

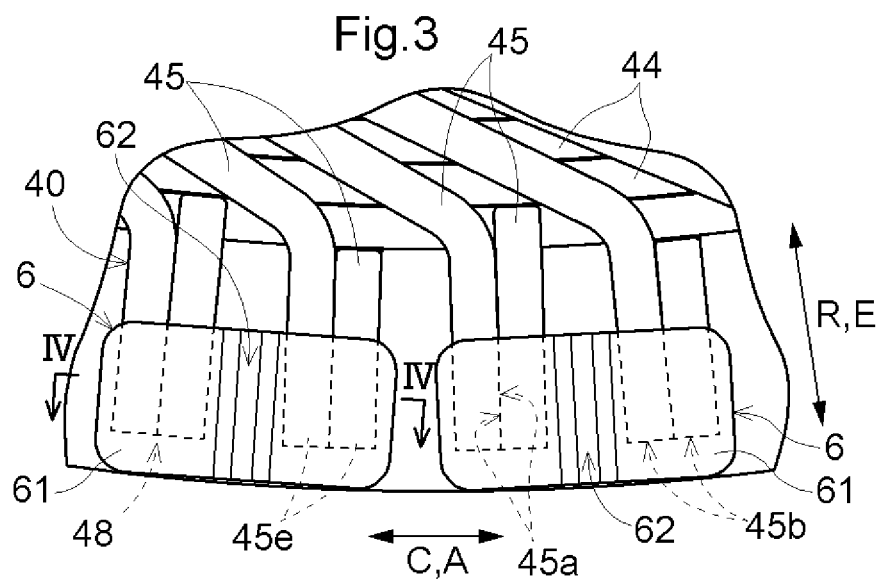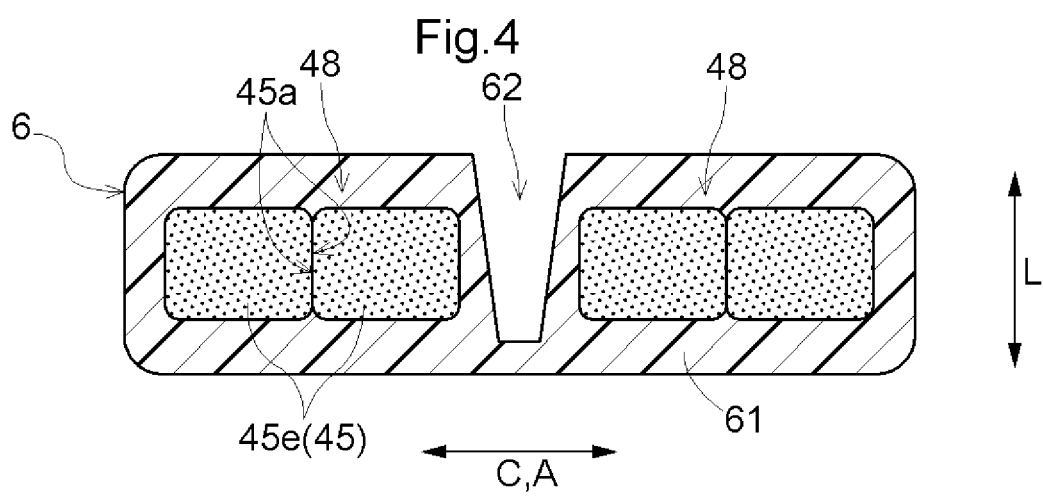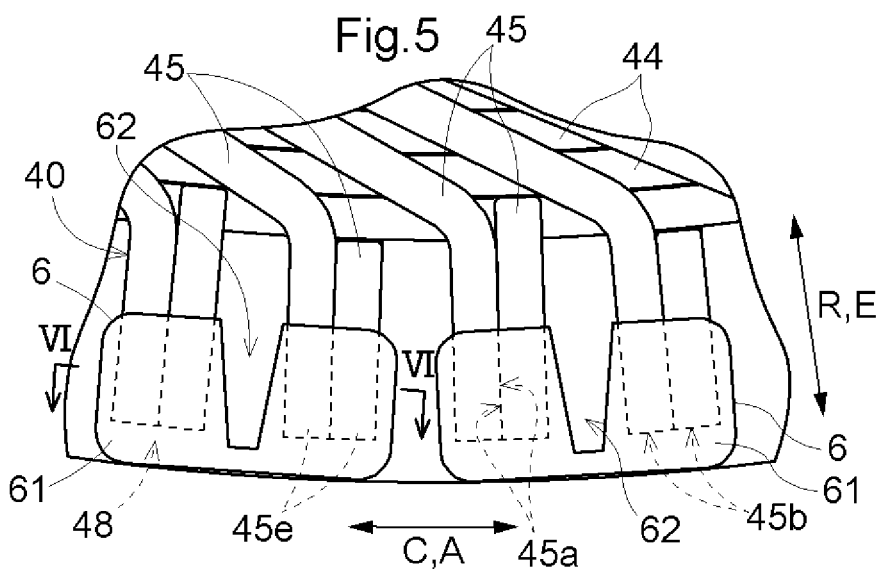

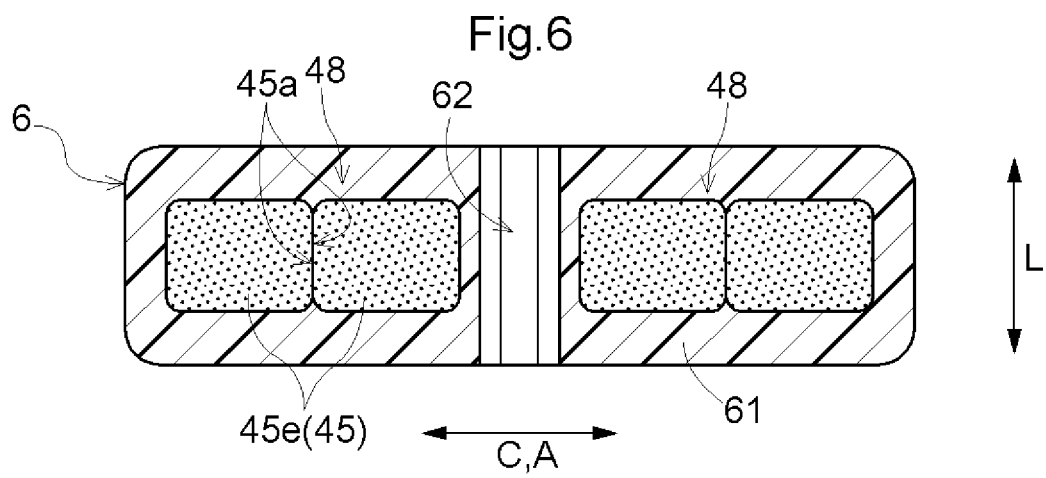
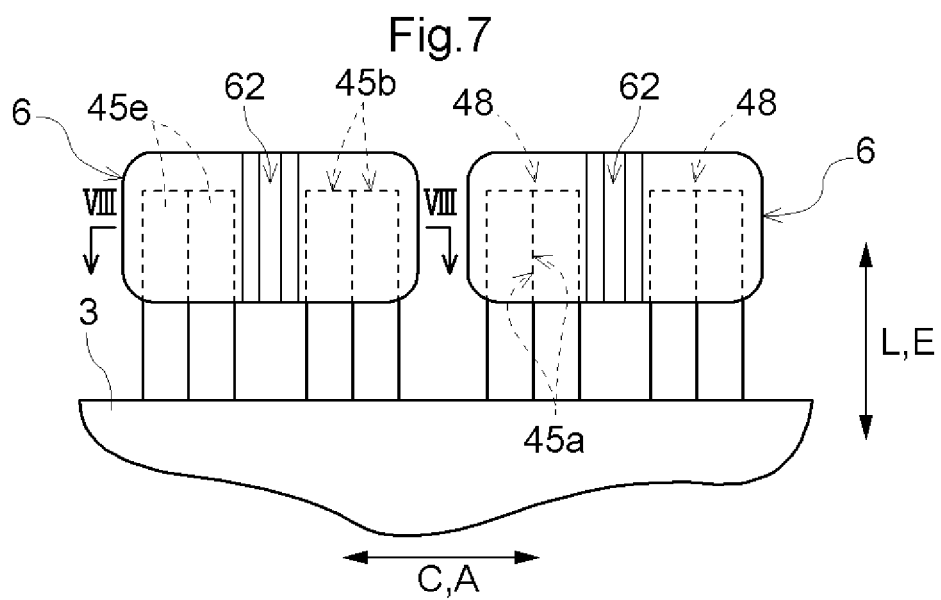
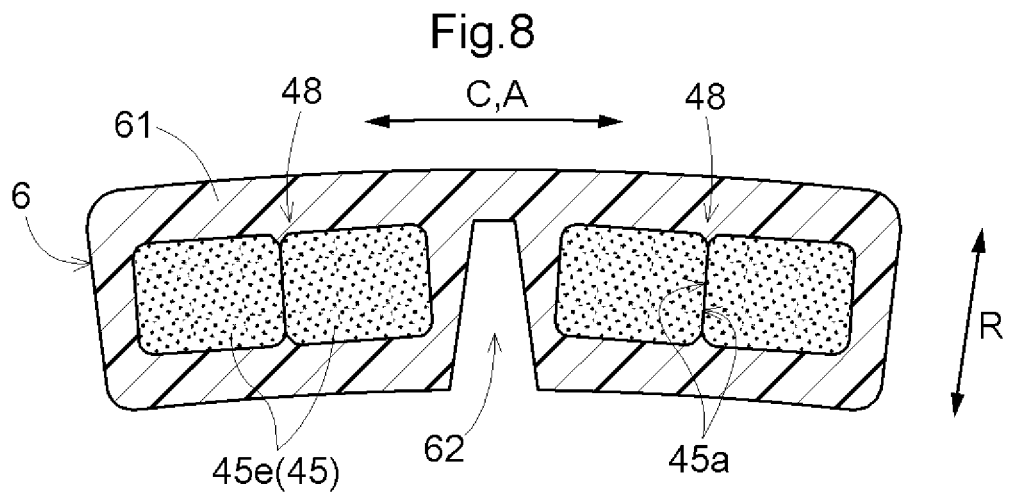

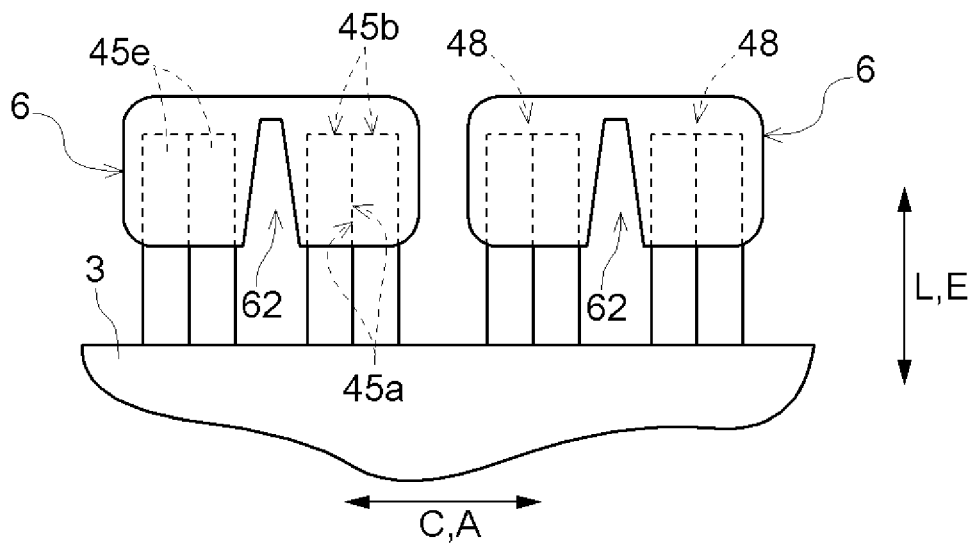
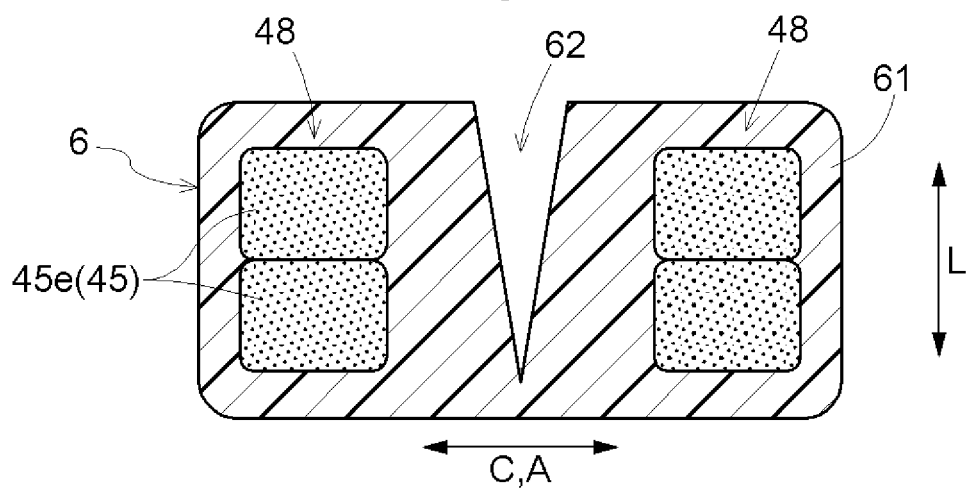
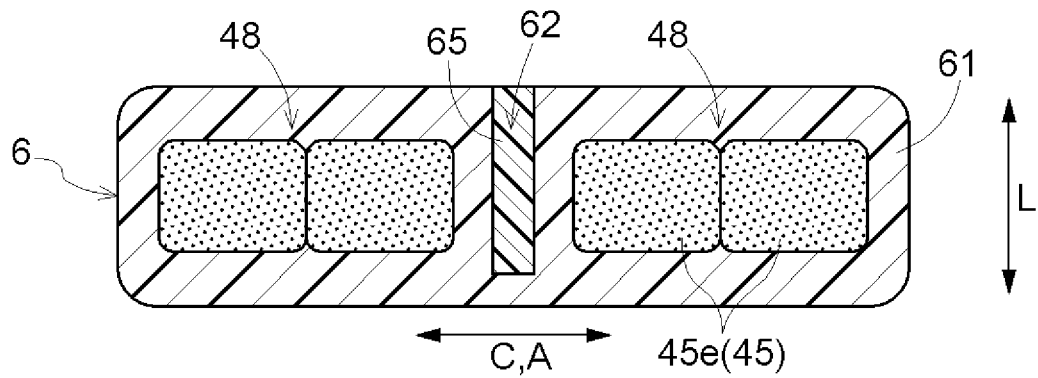

STATOR FOR ROTATING ELECTRICAL MACHINE

BACKGROUND

The present disclosure relates to stators for rotating electrical machines.

Common stators for rotating electrical machines include a core having a plurality of slots and a coil mounted on the core. Among such stators for rotating electrical machines, a stator for a rotating electrical machine is known in which the coil includes a plurality of conductor wire portions aligned in the slots. Bare ends of the conductor wire portions which project beyond the slots are bonded together to form bonded ends. It is therefore necessary to ensure electrical insulation in the bonded ends after the bonding. In this respect, for example, Japanese Patent Application Publication No. 2001-238419 (JP 2001-238419 A) discloses that bonded ends formed by bonding ends of conductor wire portions are coated with an insulating resin. JP 2001-238419 A further discloses that the space between adjacent ones of the bonded ends is filled with the insulating resin in order to increase rigidity of a coil end portion.

However, spray coating described in JP 2001-238419 A requires a pretreatment such as masking, and fluidized bed coating described in JP 2001-238419 A also requires a pretreatment such as preheating. Both of the coating methods are disadvantageous in that a pretreatment such as viscosity adjustment of the insulating resin to be applied is required in order to fill the space between adjacent ones of the bonded ends with the insulating resin and in that it is not easy to satisfactorily fill the space between the bonded ends with the insulating resin.

SUMMARY

It is desired to appropriately ensure electrical insulation between adjacent ones of bonded ends in the case where a coil of a stator for a rotating electrical machine is produced by connecting a plurality of conductor wire portions to each other.

A stator for a rotating electrical machine according to the present disclosure includes a tubular core having a plurality of slots; and a coil mounted in the core, wherein the coil includes a plurality of conductor wires aligned in the slots, each of the conductor wires has ends projecting beyond the slot, a pair of the ends are bonded together to form a bonded end, a plurality of the bonded ends are arranged next to each other in a circumferential direction of the core and are arranged in a radial pattern so as to extend in a radial direction of the core, and a cap is formed by molding using a resin material having electrical insulation properties so that the cap integrally covers adjacent ones of the plurality of bonded ends.

With this configuration, the cap that integrally covers adjacent ones of the plurality of bonded ends is formed by using a molding technique that less requires a pretreatment as compared to powder coating etc. Accordingly, electrical insulation between the adjacent ones of the bonded ends can be easily ensured. The plurality of bonded ends are arranged in a radial pattern so as to extend in the radial direction of the core. This can reduce the overall axial length of the stator for the rotating electrical machine as compared to the case where the bonded ends are formed so as to extend in an axial direction of the core. Moreover, since an interval between a pair of the bonded ends gradually increases as they extend farther from their base ends and closer to their distal ends, a resistance force is caused which is against a radial pullout force that is applied to the cap integrally covering the pair of bonded ends. The cap can therefore be prevented from coming off from the bonded ends even if, e.g., the stator for the rotating electrical machine is subjected to vibration etc. Electrical insulation between the adjacent ones of the bonded ends can thus be appropriately maintained for a long period of time even in environments where the stator is subjected to vibration etc.

Further features and advantages of the technique according to the present disclosure will become more apparent from the following description of exemplary, non-restrictive embodiments which is given with reference to the accompanying drawings.

BRIEF DESCRIPTION OF THE DRAWINGS

FIG. 3 is a plan view of bonded ends.

FIG. 4 is a sectional view taken along line IV-IV in FIG. 3.

FIG. 5 is a plan view of bonded ends in a stator according to a second embodiment.

FIG. 6 is a sectional view taken along line VI-VI in FIG. 5.

FIG. 7 is a view of bonded ends in a stator according to a third embodiment as viewed in the radial direction.

FIG. 8 is a sectional view taken along line VIII-VIII in FIG. 7.

FIG. 9 is a view of bonded ends in a stator according to a fourth embodiment as viewed in the radial direction.

FIG. 10 is a sectional view of bonded ends in a stator according to a fifth embodiment.

FIG. 11 is a sectional view of bonded ends in a stator according to a sixth embodiment.

DETAILED DESCRIPTION OF EMBODIMENTS

First Embodiment

A first embodiment of a stator for a rotating electrical machine will be described. A stator 1 of the present embodiment is a stator for a rotating electrical machine and is used with a rotor (not shown). The term "rotating electrical machine" defines a concept including all of a motor (electric motor), a generator (electric generator), and a motor-generator that functions as a motor and a generator as needed. More specifically, the stator 1 is a stator that is used for, e.g., a rotating field type rotating electrical machine and functions as an armature. A rotor serving as a field including permanent magnets, electromagnets, etc. is disposed radially inside the stator 1 with an air gap therebetween. The rotor is rotated by a rotating magnetic field that is generated by the stator 1.

In the following description, the "axial direction L," the "circumferential direction C," and the "radial direction R" are defined based on the axis of a cylindrical core 3. The axis of the core 3 is the axis of the inner peripheral surface of the core 3. In the following description, the positions, directions, etc. used to describe each part of a coil 4 and cap members 6 ("cap") are intended to refer to the positions, directions, etc. of each part of the coil 4 and the cap members 6 mounted in the core 3 (see FIG. 1) unless otherwise specified.

Figure 1:
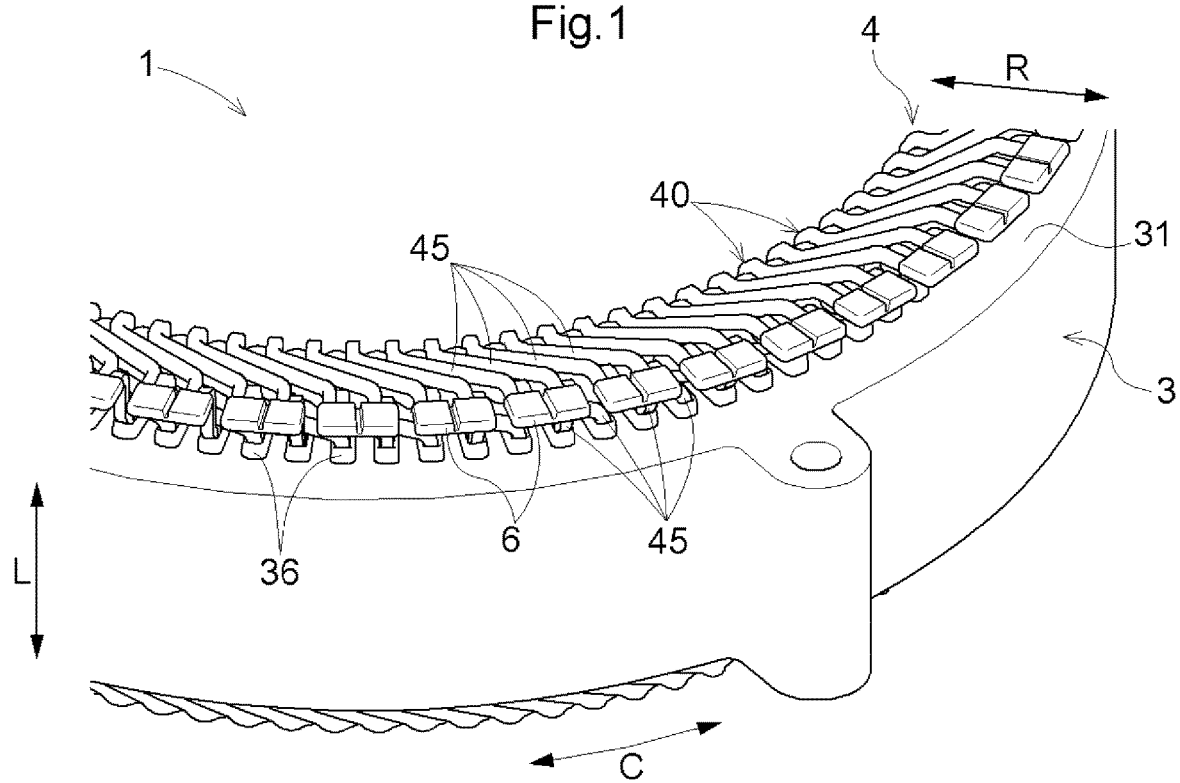
FIG. 1 is a perspective view of a stator according to a first embodiment.
Figure 2:
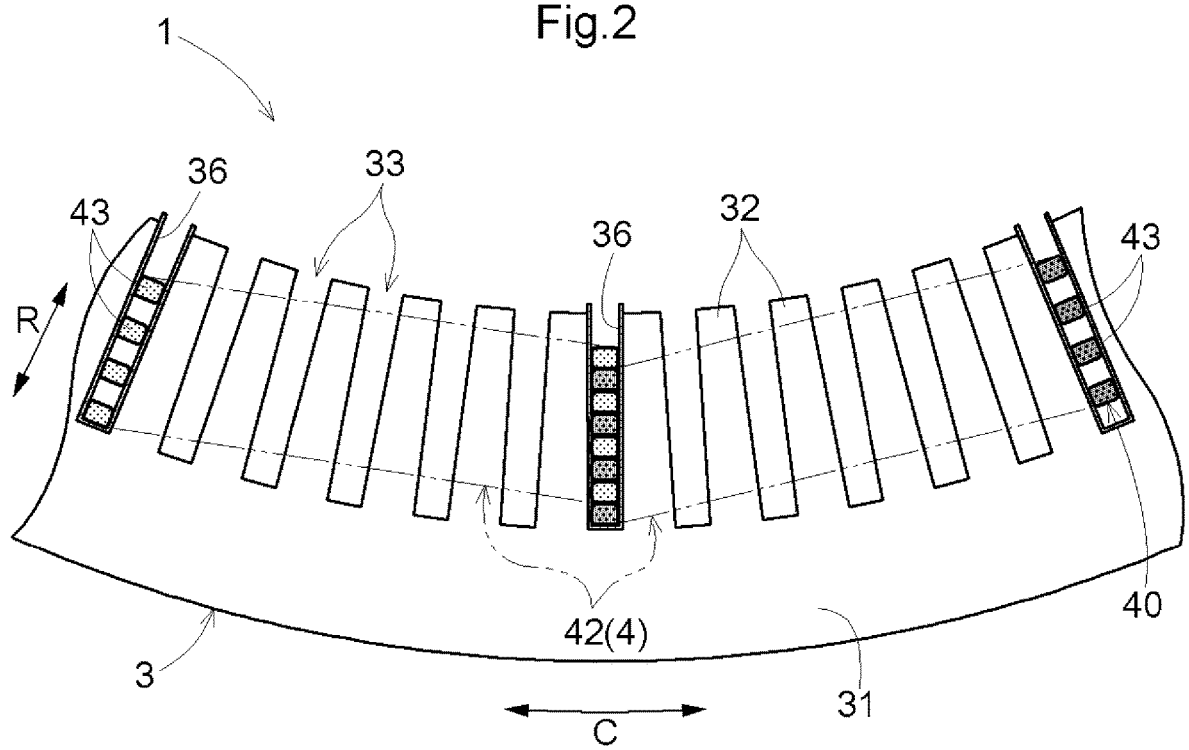
FIG. 2 is a partial sectional view of the stator.

As shown in FIG. 1, the stator 1 includes a tubular core (stator core) 3 and a coil (stator coil) 4 mounted in the core 3. The core 3 is made of a magnetic material and, for example, is formed by stacking a plurality of magnetic material sheets (e.g., electrical steel sheets such as silicon steel sheets) in the axial direction L. The core 3 may be mainly made of a green compact produced by pressing powder of a magnetic material. The core 3 has a hollow cylindrical shape. As shown in FIG. 2, the core 3 has an annular yoke portion 31 and a plurality of teeth 32 extending radially inward from the yoke portion 31. The plurality of teeth 32 are located at regular intervals in the circumferential direction C. A slot 33 is formed between every two of the teeth 32 which are adjacent to each other in the circumferential direction C. The slots 33 are open toward the inside in the radial direction. The plurality of slots 33 are located at regular intervals in the circumferential direction C.

In the present embodiment, the stator 1 is a stator for a rotating electrical machine that is driven by three-phase alternating currents (an example of multi-phase alternating currents). The slots 33 for U-phase, the slots 33 for V-phase, and the slots 33 for W-phase are formed in the core 3 in a repeated pattern of U-phase, V-phase, and W-phase in the circumferential direction C. For example, the number of slots per pole per phase is "2," and the slots 33 for each phase are formed in the core 3 in a repeated pattern of two slots for U-phase, two slots for V-phase, and two slots for W-phase in the circumferential direction C. In the present embodiment, the number of magnetic poles per phase is "16" (the number of magnetic pole pairs is "8") and a total of 96 (=2×16×3) slots 33 are formed in the core 3.

An insulating sheet 36 is placed along the inner wall (slot inner wall) of each slot 33. The insulating sheet 36 is provided in order to ensure electrical insulation between the core 3 and the coil 4. The insulating sheet 36 is a sheet material made of a highly insulating, highly heat resistant material. For example, the insulating sheet 36 may be a resin sheet, a paper sheet, etc. Coil side portions 43 of winding portions 42 forming the coil 4 are placed in each slot 33.

The coil 4 is formed by conductor wires 40. The conductor wires 40 include conductors having a linear shape (linear conductors) and made of a conductive material such a metal material (e.g., copper, aluminum, etc.). The conductor wires 40 have on their surfaces an insulating coating made of an insulating material such as resin, an oxide coating, etc. In the present embodiment, the conductor wires 40 are rectangular wires having a rectangular section. The term "rectangular" defines a concept including a substantially rectangular shape in addition to a rectangular shape, and for example, including a rectangular shape with arc-shaped rounded corners, a rectangular shape with chamfered corners, etc. The expression "having a rectangular section" means that the sectional shape perpendicular to the direction in which the conductor wire extends is a rectangle.

The coil 4 of the present embodiment includes a plurality of winding portions 42 each formed by winding a conductor wire 40. In the present embodiment, the coil 4 includes the same number of (in this example, 96) winding portions 42 as the teeth 32 and the slots 33. The winding portions 42 are formed in, e.g., a polygonal shape (e.g., a hexagonal shape, an octagonal shape, etc.) as viewed in the radial direction R by bending before they are mounted in the core 2.

Each winding portion 42 is wound between a pair of slots 33 (a mounting example).

Each winding portion 42 includes coil side portions 43 (see FIG. 2) extending in the axial direction L and jumper portions 44 (see FIG. 3) extending in the circumferential direction C. The coil side portions 43 are placed in the slots 33. The coil side portions 43 extend straight so as to extend through the slots 33 in the axial direction L. The coil side portions 43 of each winding portion 42 which are located at different positions in the circumferential direction C are placed in a pair of slots 33 in which this winding portion 42 is fitted. Regarding each winding portion 42, the coil side portions 43 located on one side in the circumferential direction C and the coil side portions 43 located on the other side in the circumferential direction C are placed in a pair of slots 33 that are separated from each other by, e.g., six slots, and each jumper portion 44 is located outside (outside in the axial direction L) the core 3 and connects a pair of coil side portions 43, which are placed in the different slots 33, in the circumferential direction C.

In the present embodiment, each winding portion 42 is formed by winding a conductor wire 40 a plurality of times. As shown in FIG. 2, a plurality of coil side portions 43 of a single winding portion 42, which are placed in a single slot 33, are arranged in line at intervals in the radial direction R so that a space having a size corresponding to a conductor wire 40 is provided between every two of the coil side portions 43 which are adjacent to each other in the radial direction R. The coil side portions 43 of another winding portion 42 of the same phase are placed in the clearances provided between every two of the coil side portions 43 which are adjacent to each other in the radial direction R. A plurality of coil side portions 43 are thus arranged in line in the radial direction R in each slot 33, and the coil side portions 43 of a first winding portion 42 which are located on one side in the circumferential direction C and the coil side portions 43 of a second winding portion 42 which are located on the other side in the circumferential direction C are arranged alternately in the radial direction R. The coil 4 (winding portions 42) thus has a plurality of coil side portions 43 aligned in the slots 33. In the present embodiment, the coil side portions 43 correspond to the "conductor wire portions" or "conductor wires."

Each coil side portion 43 has ends projecting beyond the slot 33. The ends of each pair of coil side portions 43 included in the same winding portion 42 are connected together to form the jumper portion 44 described above. Of those parts of the coil side portions 43 which project beyond the slots 33, the parts that are not connected to the ends of the other coil side portions 43 included in the same winding portion 42 are connection portions 45 (see FIGS. 1 and 3). The connection portions 45 are the parts that connect the winding portion 42 to which these connection portions 45 belong to other winding portions 42.

Each winding portion 42 has connection portions 45 in its both ends. All of the connection portions 45 are located outside (outside in the axial direction L) the core 3 on one side in the axial direction L. As can be seen from FIG. 1, the connection portions 45 extending from the coil side portions 43 located in an inner layer (on the inner side in the radial direction) pass through a position further outside the core 3 (a position farther away from the core 3) than the jumper portions 44 and are connected to the connection portions 45 extending from the coil side portions 43 located in an outer layer (on the outer side in the radial direction). The connection portions 45 of the present embodiment are placed such that their ends 45e extend in the radial direction R (see also FIG. 3).

In a pair of winding portions 42, the winding portions 42 are electrically connected to each other with the ends 45e of their connection portions 45 being bonded together. The ends 45e of each pair are bonded together by performing, e.g., arc welding such as TIG welding, electron beam welding, laser beam welding, resistance welding, ultrasonic welding, brazing, soldering, etc. on exposed (bare) linear conductors, namely with the insulating coating removed from the conductor wires 40. As shown in FIG. 3, in the present embodiment, in a pair of ends 45e placed so as to extend in the radial direction R, the ends 45e are bonded together such that their side surfaces 45a facing each other in the circumferential direction C contact each other. In the pair of ends 45e, the ends 45e are also bonded such that their distal end faces 45b facing toward the projecting distal ends (toward the outside in the present embodiment) are substantially flush with each other in the radial direction R. A bonded end 48 is thus formed by paired ends 45e directly bonded together.

In the present embodiment, the bonded ends 48 are placed so as to extend in the radial direction R, namely in the same direction as the direction in which the ends 45e of the connection portions 45 extend. The plurality of bonded ends 48 are arranged in a radial pattern so as to extend in the radial direction R. That is, in the present embodiment, the bonded ends 48 are arranged so that the direction E in which the bonded ends 48 extend is the radial direction R. The plurality of bonded ends 48 are arranged next to each other in the circumferential direction C, namely in the direction in which the plurality of slots 33 are arranged. That is, in the present embodiment, the bonded ends 48 are arranged so that the direction A in which the bonded ends 48 are arranged (the direction in which the plurality of bonded ends 48 are arranged next to each other) is the circumferential direction C. In the present embodiment, the same number of (in this example, 96) bonded ends 48 as the slots 33 are arranged at a pitch corresponding to the pitch at which the slots 33 are formed.

The cap members 6 that cover the bonded ends 48 are provided in order to appropriately insulate the bonded ends 48 formed by bonding the bare conductor wires 40, after the bonding. The cap members 6 are made of a resin material having electrical insulation properties. The cap members 6 are made of a resin material having at least a certain level of mechanical strength. The resin material for the cap members 6 may be either a thermoplastic resin or a thermosetting resin. Specific examples of the resin material include polyphenylene sulfide (PPS), liquid crystal polymers (LCPs), polyamides (PAs), polybutylene terephthalate (PBT), polyethylene terephthalate (PET), polystyrenes (PSs), polyether ether ketone (PEEK), phenol resins (PFs), melamine resins (MFs), and epoxy resins (EPs). From the standpoint of ease of reduction in size of manufacturing facilities, thermoplastic resins are preferable, and for example, PPS, PBT, etc. are particularly preferable.

Each cap member 6 is formed so as to integrally cover a plurality of bonded ends 48 that are adjacent to each other in the circumferential direction C. This can improve rigidity of a coil end portion, namely a part of the coil 4 which projects beyond the core 3 in the axial direction L. In the present embodiment, each cap member 6 integrally covers two bonded ends 48 that are adjacent to each other in the circumferential direction C. The number of cap members 6 (in this example, 48 cap members 6) is half the number of bonded ends 48, and the cap members 6 are arranged next to each other in the circumferential direction C, namely in the direction in which the plurality of bonded ends 48 are arranged. The plurality of cap members 6 are arranged outside (outside in the axial direction L) the core 3 on one side in the axial direction L so as to form an annular pattern (see FIG. 1).

As shown in FIGS. 3 and 4, each cap member 6 includes a body portion 61 that integrally covers two adjacent bonded ends 48, and a groove 62 formed in the body portion 61. The body portion 61 is formed in the shape of a flat rectangular parallelepiped so as to completely cover, with a predetermined thickness, both sides in the circumferential direction C of the two adjacent bonded ends 48, both sides in the axial direction L of the two adjacent bonded ends 48, and the outer side in the radial direction of the two adjacent bonded ends 48. The groove 62 has a portion sandwiched between the pair of bonded ends 48 that are adjacent to each other in the circumferential direction C. In this example, the groove 62 is a cut extending between the pair of adjacent bonded ends 48 in the circumferential direction C. The groove 62 is a groove intentionally formed in the body portion 61, and any possible recesses that are not intended by a manufacturing entity, including "sink marks" that are formed by molding shrinkage of the resin material forming the cap members 6, are not included in the groove 62.

In the present embodiment, each groove 62 has a depth in the axial direction L perpendicular to the direction E in which the bonded ends 48 extend, and extends in the radial direction R, namely in the direction E in which the bonded ends 48 extend. Each groove 62 has a trapezoidal section as viewed in the direction in which the groove 62 extends (the radial direction R).

Each groove 62 has a portion that overlaps the bonded ends 48 as viewed in the circumferential direction C, namely in the direction A in which the pair of bonded ends 48 are arranged. Each groove 62 has a portion that overlaps half or more (preferably ¾ or more, and more preferably ⅘ or more) of the bonded ends 48 as viewed in the circumferential direction C. In the present embodiment, each groove 62 is formed so as to overlap the entire bonded ends 48 as viewed in the circumferential direction C. That is, each groove 62 has such a depth in the axial direction L that covers the entire region where the bonded ends 48 are placed (a depth equal to or greater than the length of the shorter side of a single rectangular wire as the conductor wire 40), as viewed in the circumferential direction C, namely in the direction A in which the pair of bonded ends 48 are arranged.

Such cap members 6 can be formed on the bonded ends 48 with a molding technique (e.g., an injection molding technique) after the bonded ends 48 are formed (i.e., after the ends 45e of each connection portion 45 are bonded together). That is, after the bonded ends 48 are formed, the cap members 6 can be formed by molding using a mold that is closed with the bonded ends 48, which project in the radial direction R and are arranged in the annular pattern, being sandwiched between mold halves in the axial direction L. A cavity that is formed in the closed mold is designed to have a shape corresponding to the outer shape of the cap members 6 (the body portions 61 having the grooves 62).

In the case where the cap members 6 are formed by molding, any void between a pair of adjacent bonded ends 48 may cause a short circuit between the bonded ends 48 due to surface discharge inside the void. In this regard, in the present embodiment, each cap member 6 has a groove 62 having a portion sandwiched between a pair of adjacent bonded ends 48. Accordingly, even if a void or voids are created between each of the paired bonded ends 48 and the groove 62, the creepage distance is increased as the surface of each cap member 6 is bent along the groove 62. This can reduce the risk of a short circuit between the paired bonded ends 48.

Since the groove 62 is formed between the paired bonded ends 48, it can be expected that voids themselves are less likely to be created. Voids are created in the cap members 6 due to bubbles etc. that are formed in the cap members 6 during molding. Forming the groove 62 reduces the thickness of the molding resin and thus reduces the range in which voids may be created. Accordingly, voids themselves are less likely to be created. Moreover, forming the groove 62 allows the operator to check from the outside, either visually or by image inspection etc., if there is any void formed at the surface of the groove 62. Even if the presence or absence of voids at the surface of the groove 62 cannot be checked from the outside, insulation performance can be determined by, e.g., a vacuum discharge test etc. Since the groove 62 is formed between the paired bonded ends 48, it can be expected that voids themselves are less likely to be created as compared to the configuration having no such grooves 62. Moreover, whether degradation in insulation performance due to voids has occurred or not can be determined by various inspections. For these reasons, the risk of a short circuit between the paired bonded ends 48 can be effectively reduced. The use of the molding technique and the above design of the shape of the cap members 6 allows electrical insulation between the adjacent bonded ends 48 to be easily and appropriately ensured.

In the present embodiment, the cap members 6 integrally cover the plurality of bonded ends 48 arranged in a radial pattern so as to extend in the radial direction R and located adjacent to each other in the circumferential direction C. Accordingly, each of the paired bonded ends 48 with the interval in the circumferential direction C therebetween gradually increasing toward the outside in the radial direction naturally applies a pullout resistance force to the cap member 6. The cap members 6 can therefore be prevented from coming off from the bonded ends 48 even if, e.g., the stator 1 is subjected to vibration etc., and electrical insulation between the adjacent bonded ends 48 can be appropriately maintained for a long period of time. Accordingly, for example, even if the stator 1 is included in a rotating electrical machine that is used as a driving force source for a vehicle and the stator 1 is supposed to be constantly subjected to relatively large vibration, reliability of the rotating electrical machine can be appropriately ensured.

Second Embodiment

A second embodiment of a stator for a rotating electrical machine will be described. The present embodiment is different from the first embodiment in the specific manner in which a groove 62 is formed in each cap member 6. A stator 1 of the present embodiment will be described mainly regarding the differences from the first embodiment. Regarding those points which are not specifically described below, the second embodiment is similar to the first embodiment. Elements similar to those of the first embodiment are denoted with the same reference characters as in the first embodiment and description thereof will be omitted.

As shown in FIGS. 5 and 6, each groove 62 of the present embodiment has a depth in the radial direction R, namely in the direction E in which bonded ends 48 extend, and extends in the axial direction L perpendicular to the direction E in which the bonded ends 48 extend. Each groove 62 has a trapezoidal section as viewed in the direction in which the groove 62 extends (the axial direction L). The grooves 62 having a trapezoidal section are open toward the inside in the radial direction, and each cap member 6 integrally covering a plurality of bonded ends 48 that are adjacent to each other in the circumferential direction C is a single-piece member that is continuous on the outer side in the radial direction. Each groove 62 has a portion that overlaps the entire bonded ends 48 as viewed in the circumferential direction C, namely in the direction A in which the pair of bonded ends 48 are arranged. That is, each groove 62 has such a depth in the radial direction R that covers the entire region where the bonded ends 48 are placed (a depth equal to or greater than the length of connection portions 45 buried in the cap member 6), as viewed in the circumferential direction C.

In the configuration of the present embodiment as well, electrical insulation between the adjacent bonded ends 48 can be easily and appropriately ensured as in the first embodiment. Moreover, the cap members 6 can be prevented from coming off from the bonded ends 48. Electrical insulation between the adjacent bonded ends 48 can thus be appropriately maintained for a long period of time even in environments where the stator is subjected to vibration etc.

Third Embodiment

A third embodiment of a stator for a rotating electrical machine will be described. The present embodiment is different from the first embodiment in the manner in which bonded ends 48 are arranged in a coil 4. Accordingly, the present embodiment is also somewhat different from the first embodiment in the specific manner in which a groove 62 is formed in each cap member 6. A stator 1 of the present embodiment will be described mainly regarding the differences from the first embodiment. Regarding those points which are not specifically described below, the third embodiment is similar to the first embodiment. Elements similar to those of the first embodiment are denoted with the same reference characters as in the first embodiment and description thereof will be omitted.

As shown in FIGS. 7 and 8, ends 45e of connection portions 45 of the present embodiment are arranged so as to extend in the axial direction L. The bonded ends 48 are arranged so as to extend parallel to each other in the axial direction L that is the same direction as the direction in which the ends 45e of the connection portions 45 extend. In the present embodiment, the direction E in which the bonded ends 48 extend is the axial direction L. The third embodiment is thus similar to the first embodiment in that the direction A in which the plurality of bonded ends 48 are arranged is the circumferential direction C.

Each cap member 6 of the present embodiment covers both sides in the circumferential direction C of two adjacent bonded ends 48, both sides in the radial direction R of the two adjacent bonded ends 48, and the outer side in the axial direction of the two adjacent bonded ends 48 (the opposite side of the two adjacent bonded ends 48 from the core 3 in the axial direction L). Each groove 62 having a portion sandwiched between a pair of bonded ends 48 has a depth in the radial direction R perpendicular to the direction E in which the bonded ends 48 extend, and extends in the axial direction L, namely in the direction E in which the bonded ends 48 extend. Each groove 62 has a trapezoidal section as viewed in the direction in which the groove 62 extends (the axial direction L). Each groove 62 has a portion that overlaps the entire bonded ends 48 as viewed in the circumferential direction C, namely in the direction A in which the pair of bonded ends 48 are arranged. That is, each groove 62 has such a depth in the radial direction R that covers the entire region where the bonded ends 48 are placed (a depth equal to or greater than the length of the shorter side of a single rectangular wire as a conductor wire 40), as viewed in the circumferential direction C.

In the configuration of the present embodiment as well, electrical insulation between the adjacent bonded ends 48 can be easily and appropriately ensured as in the first embodiment.

Each connection portion 45 may have a bent portion at a position closer to the core 3 than the bonded end 48 so that the bonded ends 48 of each pair become separated from each other or closer to each other in the circumferential direction C as they extend to the outer side in the axial direction. In this case, each of the paired bonded ends 48 applies a pullout resistance force to the cap member 6. Accordingly, the cap members 6 can be prevented from coming off from the bonded ends 48. Electrical insulation between the adjacent bonded ends 48 can thus be appropriately maintained for a long period of time even in environments where the stator is subjected to vibration etc.

Fourth Embodiment

A fourth embodiment of a stator for a rotating electrical machine will be described. The present embodiment is different from the third embodiment in the specific manner in which a groove 62 is formed in each cap member 6. A stator 1 of the present embodiment will be described mainly regarding the differences from the third embodiment. Regarding those points which are not specifically described below, the fourth embodiment is similar to the third embodiment. Elements similar to those of the third embodiment are denoted with the same reference characters as in the third embodiment and description thereof will be omitted.

As shown in FIG. 9, each groove 62 of the present embodiment has a depth in the axial direction L, namely in the direction E in which bonded ends 48 extend, and extends in the radial direction R perpendicular to the direction E in which the bonded ends 48 extend. Each groove 62 has a trapezoidal section as viewed in the direction in which the groove 62 extends (the radial direction R). The grooves 62 having a trapezoidal section are open toward the inside in the radial direction (toward a core 3 in the axial direction L), and each cap member 6 integrally covering a plurality of bonded ends 48 that are adjacent to each other in the circumferential direction C is a single-piece member that is continuous on the outer side in the axial direction. Each groove 62 has a portion that overlaps the entire bonded ends 48 as viewed in the circumferential direction C, namely in the direction A in which the pair of bonded ends 48 are arranged. That is, each groove 62 has such a depth in the axial direction L that covers the entire region where the bonded ends 48 are placed (a depth equal to or greater than the length of connection portions 45 buried in the cap member 6), as viewed in the circumferential direction C.

In the configuration of the present embodiment as well, electrical insulation between the adjacent bonded ends 48 can be easily and appropriately ensured as in the first embodiment.

Fifth Embodiment

A fifth embodiment of a stator for a rotating electrical machine will be described. The present embodiment is somewhat different from the first embodiment in the manner in which bonded ends 48 are formed in a coil 4. The present embodiment is also somewhat different from the first embodiment in the specific manner in which a groove 62 is formed in each cap member 6. A stator 1 of the present embodiment will be described mainly regarding the differences from the first embodiment. Regarding those points which are not specifically described below, the fifth embodiment is similar to the first embodiment. Elements similar to those of the first embodiment are denoted with the same reference characters as in the first embodiment and description thereof will be omitted.

As shown in FIG. 10, each bonded end 48 of the present embodiment is formed by bonding ends 45e of a pair of connection portions 45 such that these ends 45e are stack in the axial direction L. Accordingly, each cap member 6 integrally covering a plurality of bonded ends 48 that are adjacent to each other in the circumferential direction C is formed in the shape of a less flat rectangular parallelepiped as compared to the first embodiment. Each groove 62 is formed so as to overlap the entire bonded ends 48 as viewed in the circumferential direction C, namely in the direction A in which the pair of bonded ends 48 are arranged. That is, each groove 62 has such a depth in the axial direction L that covers the entire region where the bonded ends 48 are placed (a depth equal to or greater than the sum of the lengths of the shorter sides of two rectangular wires as conductor wires 40), as viewed in the circumferential direction C. Each groove 62 of the present embodiment has a triangular section as viewed in the direction in which the groove 62 extends (the radial direction R).

In the configuration of the present embodiment as well, electrical insulation between the adjacent bonded ends 48 can be easily and appropriately ensured as in the first embodiment. Moreover, the cap members 6 can be prevented from coming off from the bonded ends 48. Electrical insulation between the adjacent bonded ends 48 can thus be appropriately maintained for a long period of time even in environments where the stator is subjected to vibration etc.

Sixth Embodiment

A sixth embodiment of a stator for a rotating electrical machine will be described. The present embodiment is somewhat different from the first embodiment in the specific configuration of cap members 6. A stator 1 of the present embodiment will be described mainly regarding the differences from the first embodiment. Regarding those points which are not specifically described below, the sixth embodiment is similar to the first embodiment. Elements similar to those of the first embodiment are denoted with the same reference characters as in the first embodiment and description thereof will be omitted.

As shown in FIG. 11, in each cap member 6 of the present embodiment, an insulating member 65 ("insulator") is fixedly held in a groove 62 having a portion sandwiched between a pair of bonded ends 48 that are adjacent to each other in the circumferential direction C. For example, the insulating member 65 is an insulating sheet member made of a resin sheet, a paper sheet, etc. and is a separate member from the cap member 6. The expression "is a separate member from" means that the two members are produced by independent processes. The insulating member 65 may be made of the same material as that of the cap member 6 or may be made of different material from the cap member 6. Preferably, the insulating member 65 may be a resin sheet member mainly made of, e.g., a polyamide (PA), a polyimide (PI), etc.

Each cap member 6 having such an insulating member 65 fixedly held therein can be formed by molding that is performed with the insulating member 65, which is an insert, being placed in a mold so that the insulating member 65 is interposed between a pair of bonded ends 48 that are adjacent to each other in the circumferential direction C. In the present embodiment, each groove 62 is formed so as to conform to the outer surface of the insulating member 65 embedded in the cap member 6. The insulating member 65 is placed so as to overlap the entire bonded ends 48 as viewed in the circumferential direction C, namely in the direction in which the pair of bonded ends 48 are arranged.

In the configuration of the present embodiment as well, electrical insulation between the adjacent bonded ends 48 can be easily and appropriately ensured as in the first embodiment. Moreover, the cap members 6 can be prevented from coming off from the bonded ends 48. Electrical insulation between the adjacent bonded ends 48 can thus be appropriately maintained for a long period of time even in environments where the stator is subjected to vibration etc.

Furthermore, in the present embodiment, the insulating member 65 is placed between the pair of adjacent bonded ends 48 so as to overlap the entire bonded ends 48 as viewed in the circumferential direction C. This can reliably avoid the risk that the pair of bonded ends 48 may be connected by a void or voids. Electrical insulation between the adjacent bonded ends 48 can thus be more easily and more appropriately ensured.

Seventh Embodiment

A seventh embodiment of a stator for a rotating electrical machine will be described. In the first to sixth embodiments described above, the cap members 6 have a groove 62. In the present embodiment, however, cap members 6 do not have a groove 62. The configuration of a stator 1 according to the present embodiment will be described mainly regarding the differences from the first embodiment. In the description of the seventh embodiment, one side in the circumferential direction C is defined as a first side C1 in the circumferential direction, and the opposite side in the circumferential direction is defined as a second side C2 in the circumferential direction. Regarding those points which are not specifically described below, the seventh embodiment is similar to the first embodiment. Elements similar to those of the first embodiment are denoted with the same reference characters as in the first embodiment and description thereof will be omitted.

Figure 12:
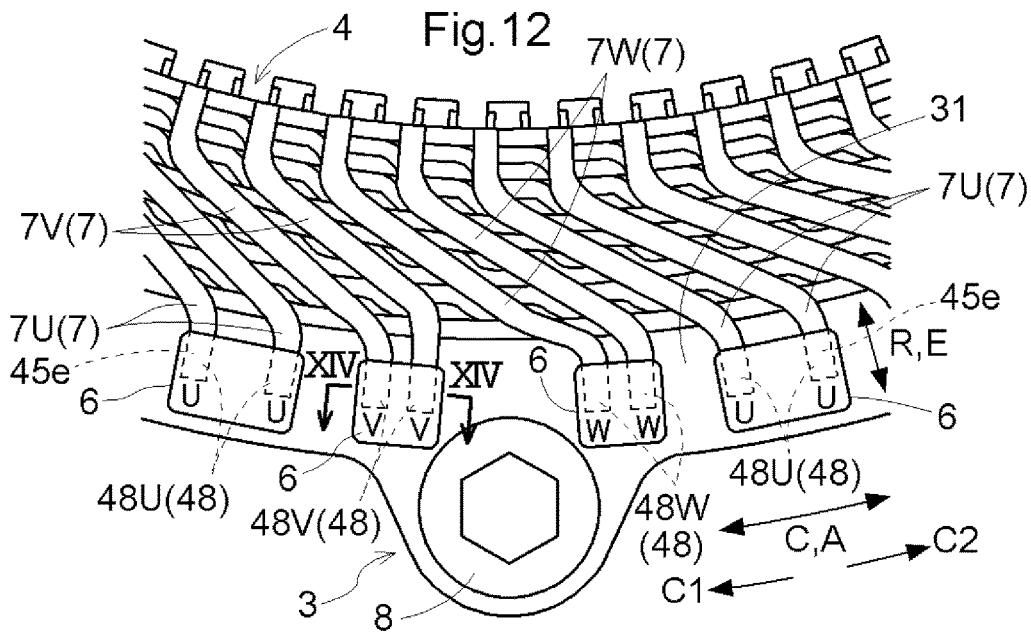
FIG. 12 is a plan view of bonded ends in a stator according to a seventh embodiment.
Figure 14:
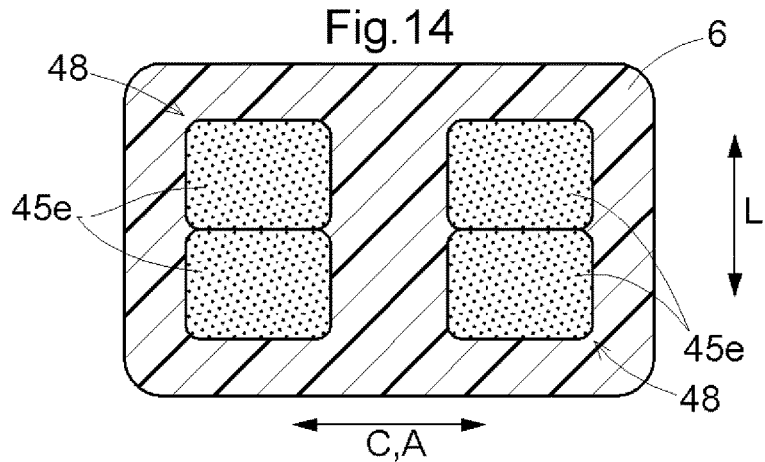
FIG. 14 is a sectional view taken along line XIV-XIV in FIG. 12.

As shown in FIG. 12, a coil 4 includes a plurality of phase coils 7 through which alternating currents of a plurality of phases flow, and the alternating currents have respective phases that are different from each other. That is, the stator 1 of the present embodiment is also a stator for a rotating electrical machine that is driven by three-phase alternating currents, namely U-phase, V-phase, and W-phase alternating currents. The phase coils 7 therefore include U-phase coils 7U that are phase coils for U-phase, V-phase coils 7V that are phase coils for V-phase, and W-phase coils 7W that are phase coils for W-phase. As shown in FIG. 12, each of connection portions 45 of the U-phase coils 7U, the V-phase coils 7V, and the W-phase coils 7W has an end 45e placed so as to extend in the radial direction R. In the present embodiment, as shown in FIG. 14, a pair of ends 45e are stacked in the axial direction L and bonded together to form a bonded end 48. As shown in FIG. 12, the ends 45e are bonded in pairs to form a plurality of bonded ends 48. The plurality of bonded ends 48 include U-phase bonded ends 48U each formed by bonding a pair of ends 45e of the U-phase coils 7U, V-phase bonded ends 48V each formed by bonding a pair of ends 45e of the V-phase coils 7V, and W-phase bonded ends 48W each formed by bonding a pair of ends 45e of the W-phase coils 7W.

The plurality of bonded ends 48 are arranged next to each other in the circumferential direction C of a core 3. In the present embodiment, the number of slots per pole per phase is "2." Accordingly, as shown in FIG. 12, the bonded ends 48 are arranged in a repeated pattern of two U-phase bonded ends 48, two V-phase bonded ends 48, and two W-phase bonded ends 48 in the circumferential direction C, like a U-phase bonded end 48U, a U-phase bonded end 48U, a V-phase bonded end 48V, a V-phase bonded end 48V, a W-phase bonded end 48W, a W-phase bonded end 48W, . . . .

Figure 13:
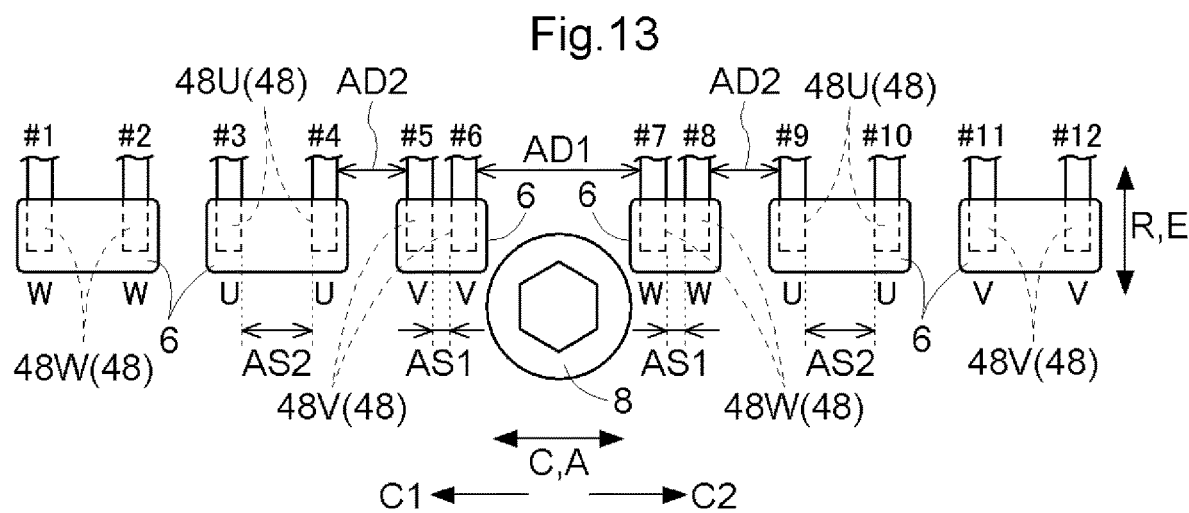
FIG. 13 is a schematic view showing the positional relationship among the bonded ends.

As described above, in the present embodiment, the bonded ends 48 are arranged in a repeated pattern of two bonded ends 48 corresponding to two U-phase coils 7, two bonded ends 48 corresponding to two V-phase coils 7, and two bonded ends 48 corresponding to two W-phase coils 7 in the circumferential direction C. Accordingly, when looking at one bonded end 48, a bonded end 48 of a different phase is located on the opposite side of this bonded end 48 from a bonded end 48 of the same phase in the circumferential direction C. FIG. 13 is a diagram schematically showing the positional relationship among a plurality of bonded ends 48. The plurality of bonded ends 48 arranged in the circumferential direction C are numbered in ascending order toward the second side C2 in the circumferential direction. For example, when looking at the V-phase bonded end 48V numbered #6, the V-phase bonded end 48V numbered #5, which is a bonded end 48 of the same phase, is located on the first side C1 in the circumferential direction of the V-phase bonded end 48V numbered #6. The W-phase bonded end 48V numbered #7, which is a bonded end 48 of a different phase, is located on the second side C2 in the circumferential direction of the V-phase bonded end 48V numbered #6.

As shown in FIG. 12, a plurality of bonded ends 48 are arranged in a radial pattern so as to extend in the radial direction R of the core 3. In the present embodiment, all of the bonded ends 48 are arranged in a radial pattern so as to extend in the radial direction R about the axis of the core 3. The interval in the circumferential direction C between adjacent ones of the bonded ends 48 therefore increases as they extend closer to the outer side in the radial direction R.

Each cap member 6 is formed so as to integrally cover a plurality of bonded ends 48 of the same phase. In the present embodiment, a U-phase bonded end 48U and an adjacent U-phase bonded end 48U located on one side in the circumferential direction C of this U-phase bonded end 48U are integrally covered by a cap member 6. The same applies to the V-phase bonded ends 48V and the W-phase bonded ends 48W. Since a plurality of bonded ends 48 that are integrally covered by a cap member 6 are bonded ends of phase coils 7 of the same phase having a smaller potential difference therebetween than phase coils 7 of different phases, the risk of a short circuit etc. is reduced. In the present embodiment, the plurality of bonded ends 48 arranged in a radial pattern so as to extend in the radial direction R are integrally covered by the cap members 6. The bonded ends 48 thus apply a resistance force against a radially outward force that is applied in the radial direction R in which the cap members 6 would come off. The cap members 6 can therefore be prevented from coming off from the bonded ends 48.

The interval in the circumferential direction C between adjacent ones of a plurality of bonded ends 48 of phase coils 7 of the same phase is made smaller than the interval between adjacent ones of a plurality of bonded ends 48 of phase coils 7 of different phases at least in a region in the circumferential direction C. Each of the intervals shown by AD1 and AD2 in FIG. 13 is the "interval between adjacent ones of a plurality of bonded ends 48 of phase coils 7 of different phases." Each of the intervals shown by AS1 and AS2 is the "interval in the circumferential direction C between adjacent ones of a plurality of bonded ends 48 of phase coils 7 of the same phase." Hereinafter, for convenience of description, the intervals AD1, AD2 are referred to as the first different-phase interval AD1 and the second different-phase interval AD2, and the intervals AS1, AS2 are referred to as the first same-phase interval AS1 and the second same-phase interval AS2.

A region in the circumferential direction C where the bonded ends 48 are placed includes an even region where the second different-phase interval AD2 and the second same-phase interval AS2 are made equal to each other and are provided alternately in the circumferential direction C, and an uneven region where the first same-phase interval AS1, which is made smaller than the second different-phase interval AD2 and the second same-phase interval AS2, and the first different-phase interval AD1, which is made larger than the second different-phase interval AD2 and the second same-phase interval AS2, are provided. The even region refers to a region where the intervals between a plurality of bonded ends 48 are evenly arranged, and the uneven region refers to a region where the intervals between a plurality of bonded ends 48 are unevenly arranged. In the present embodiment, as shown in, e.g., FIG. 13, the region in the circumferential direction C from the W-phase bonded end 48W numbered #1 to the U-phase bonded end 48U numbered #4 and the region in the circumferential direction C from the U-phase bonded end 48U numbered #9 to the V-phase bonded end 48V numbered #12 are even regions, and the region in the circumferential direction C from the V-phase bonded end 48V numbered #5 to the W-phase bonded end 48W numbered #8 is an uneven region. In the uneven region, the interval in the circumferential direction C between the V-phase bonded end 48V numbered #5 and the V-phase bonded end 48V numbered #6 is made small, and this interval is the first same-phase interval AS1. Similarly, the interval in the circumferential direction C between the W-phase bonded end 48W numbered #7 and the W-phase bonded end 48W numbered #8 is made small, and this interval is the first same-phase interval AS1. In the uneven region, since a part of the intervals is small as described above, the interval in the circumferential direction C between the V-phase bonded end 48V numbered #6 and the W-phase bonded end 48W numbered #7 is made larger accordingly, and this interval is the first different-phase interval AD1. The first different-phase interval AD1 is the largest interval among the intervals in the circumferential direction C between a pair of adjacent bonded ends 48 in the even and uneven regions. For example, the first different-phase interval AD1 and the first same-phase interval AS1 can be provided by, after placing a plurality of bonded ends 48 at regular intervals in a region in the circumferential direction C, selecting desired bonded ends 48 from the plurality of bonded ends 48 and deforming the selected bonded ends 48 so as to reduce the intervals between the bonded ends 48 of the same phase. For example, as shown in FIG. 13, both the V-phase bonded end 48V numbered #6 and the W-phase bonded end 48W numbered #7 are selected as bonded ends to be deformed. The V-phase bonded end 48V numbered #6 is moved toward the first side C1 in the circumferential direction, and the W-phase bonded end 48W numbered #7 is moved toward the second side C2 in the circumferential direction, whereby the first different-phase interval AD1 is provided between the V-phase bonded end 48V numbered #6 and the W-phase bonded end 48W numbered #7.

As shown in FIG. 12, the core 3 has an attachment portion 8 ("attachment") through which the core 3 is attached to another member. In the present embodiment, the attachment portion 8 is a fastening member such as a bolt that is inserted through an attachment hole formed in the core 3. That another member is a member to which the stator 1 is attached, and is, e.g., a case that accommodates the stator 1.

The attachment portion 8 is disposed between adjacent ones of the plurality of bonded ends 48 of different phases as viewed in the axial direction L of the core 3. The attachment portion 8 is disposed so as to have a portion located at the same position in the radial direction R as the bonded ends 48. In the present embodiment, as shown in FIG. 13, the attachment portion 8 is disposed in the first different-phase interval AD1 between the V-phase bonded end 48V numbered #6 and the W-phase bonded end 48W numbered #7 out of adjacent ones of the plurality of bonded ends 48 of different phases. Since the attachment portion 8 is disposed in the first different-phase interval AD1, namely the largest interval in the entire region in the circumferential direction C, it is easier to avoid contact between the attachment portion 8 and the bonded ends 48. This can reduce the risk of a short circuit etc. caused by contact between the attachment portion 8 and the bonded ends 48.

Figure 15:
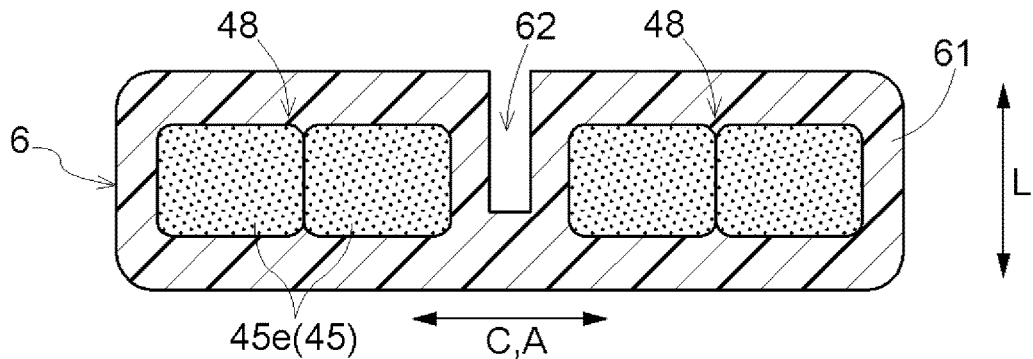
FIG. 15 is a sectional view of bonded ends according to a further embodiment.

Other Embodiments (1) Each of the above embodiments is described with respect to an example in which each groove 62 is formed so as to overlap the entire bonded ends 48 as viewed in the circumferential direction C, namely in the direction A in which the pair of bonded ends 48 are arranged. However, the present disclosure is not limited to this configuration. For example, as shown in FIG. 15, each groove 62 may be formed so as to overlap only a part (in the illustrated example, about ¾) of the bonded ends 48 as viewed in the circumferential direction C. The grooves 62 are designed to have such a depth that can ensure a required creepage distance between the pair of bonded ends 48 even if a void or voids are created in the body portion 61.

(2) Each of the above embodiments is described with respect to an example in which the grooves 62 have a trapezoidal or triangular section. However, the present disclosure is not limited to this configuration. For example, as shown in FIG. 15, the grooves 62 may have a rectangular section. Alternatively, any appropriate non-undercut shape may be selected as the sectional shape of the grooves 62.

Figure 16:
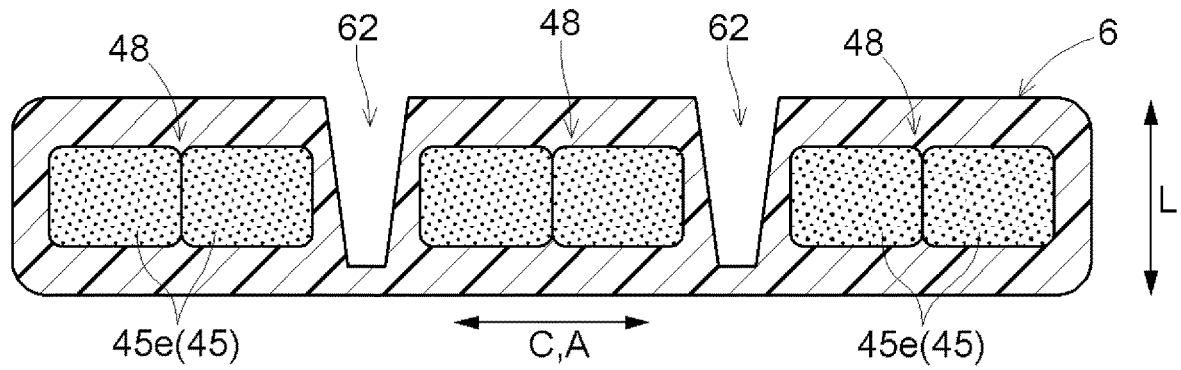
FIG. 16 is a sectional view of bonded ends according to a still further embodiment.
Figure 17:
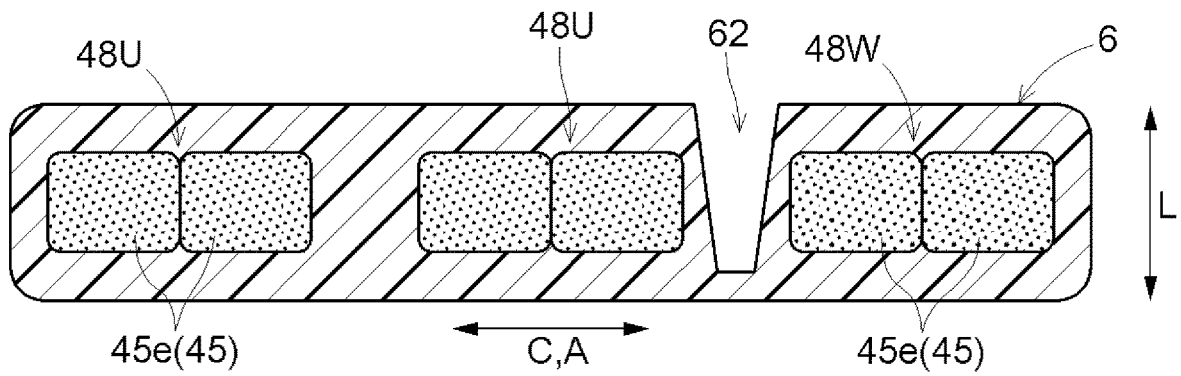
FIG. 17 is a sectional view of bonded ends according to a yet further embodiment.

(3) Each of the above embodiments is described with respect to an example in which each cap member 6 integrally covers two bonded ends 48 that are adjacent to each other in the circumferential direction C. However, the present disclosure is not limited to this configuration. For example, as shown in FIG. 16, each cap member 6 may integrally cover three or more bonded ends 48 that are adjacent to each other in the circumferential direction C. In this case, three or more bonded ends 48 that are covered by each cap member 6 may be formed by phase coils of different phases. For example, as shown in FIG. 17, the cap member 6 may integrally cover two bonded ends 48U, 48U formed by phase coils of the same phase and a single bonded end 48W formed by phase coil of a different phase from the bonded ends 48U, 48U. In this case, it is more preferable to form a groove 62 between the bonded ends 48U, 48W formed by phase coils of different phases. Although not shown in the figures, it is also preferable to increase the interval between the bonded ends 48U, 48W instead of forming the groove 62. It is preferable that each cap member 6 integrally cover D bonded ends 48 that are adjacent to each other in the circumferential direction C, where "D" represents a factor of the number of bonded ends 48. In this case, a total of (D−1) grooves 62 are formed per cap member 6 so that a groove 62 is located between every pair of bonded ends 48 that are adjacent to each other in the circumferential direction C.

(4) Each of the above embodiments is described with respect to an example in which the direction E in which the bonded ends 48 extend is the radial direction R or the axial direction L. However, the present disclosure is not limited to this configuration. For example, the bonded ends 48 may extend in a direction crossing the radial direction R or the axial direction L. In the case where the direction E in which the bonded ends 48 extend is the radial direction R, the bonded ends 48 may extend inward in the radial direction.

(5) Each of the above embodiments is described with respect to an example in which the ends 45e of each pair of connection portions 45 are directly bonded together. However, the present disclosure is not limited to this configuration. For example, the ends 45e of each pair of connection portions 45 may be connected via a connection member that is a separate member from the connection portions 45. In the specification, such indirect connection is also included in the concept of "a pair of ends are bonded together." In this case, the connection member is bonded at its both ends to the ends 45e of the connection portions 45 to form two bonded ends 48.

(6) Each of the above embodiments is described with respect to an example in which the coil 4 has a plurality of coil side portions 43 arranged in line in each slot 33. However, the present disclosure is not limited to this configuration. For example, a plurality of coil side portions 43 may be arranged in a plurality of rows in each slot 33.

(7) Each of the above embodiments is described with respect to an example in which the coil 4 has a plurality of winding portions 42. However, the present disclosure is not limited to this configuration. For example, the coil 4 may include a plurality of segment conductors each comprised of a single coil side portion 43 and a pair of connection portions 45 extending from the single coil side portion 43. In this case, the bonded ends 48 are arranged next to each other not only in the circumferential direction C but also in the radial direction R. Each cap member 6 may be formed so as to integrally cover a plurality of bonded ends 48 that are adjacent to each other in the circumferential direction C or may be formed so as to integrally cover a plurality of bonded ends 48 that are adjacent to each other in the radial direction R.

(8) In the configuration of each of the above embodiments, the specifications of the stator 1 itself can be determined as desired. For example, the number of phases, the number of magnetic poles, the number of slots, the number of layers (the number of coil side portions 43 that are arranged next to each other in the radial direction R in a single slot 33), a winding method for the coil 4, etc. can be determined as appropriate according to characteristics required for the rotating electrical machine.

(9) Each of the above embodiments is mainly described on the assumption that the rotating electrical machine including the stator 1 is a rotating electrical machine for driving a vehicle which is used as a driving force source for the vehicle. However, the present disclosure is not limited to this configuration. The technique according to this disclosure is applicable to the stators 1 included in rotating electrical machines for various applications such as, e.g., industrial equipment and robots.

(10) The seventh embodiment is described with respect to an example in which two first same-phase intervals AS1 are provided in the uneven region where the first same-phase interval AS1 and the first different-phase interval AD1 are provided. However, the present disclosure is not limited to this configuration. A single first same-phase interval AS1 may be provided in the uneven region. In this case, the first different-phase interval AD1 is provided on the first side C1 or the second side C2 in the circumferential direction of one of the bonded ends 48 forming the first same-phase interval AS1.

Figure 18:
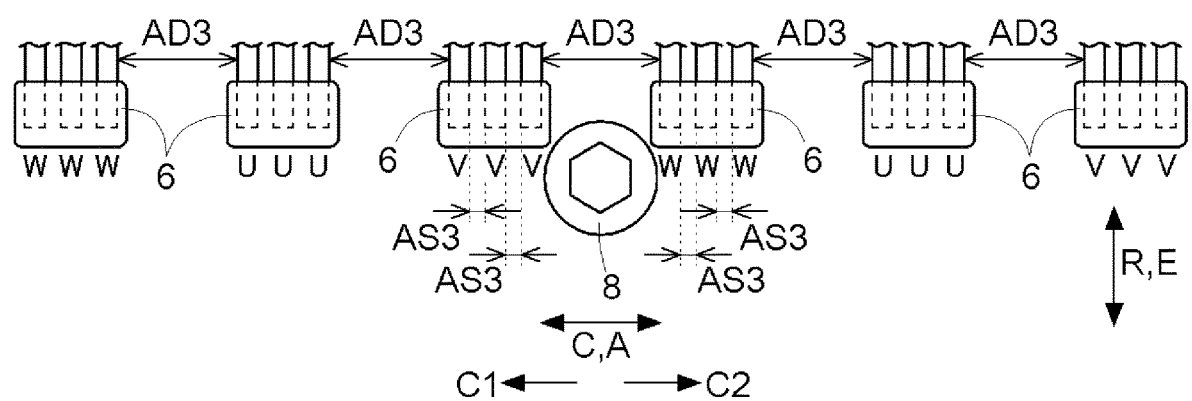
FIG. 18 is a schematic view showing the positional relationship among bonded ends according to a yet further embodiment.

(11) As shown in FIG. 13, the seventh embodiment is described with respect to an example in which the region in the circumferential direction C where the bonded ends 48 are provided includes an even region where a plurality of bonded ends 48 are arranged at regular intervals and an uneven region where a plurality of bonded ends 48 are not arranged at regular intervals and the attachment portion 8 is disposed in the first different-phase interval AD1. However, the present disclosure is not limited to this configuration. As shown in FIG. 18, each same-phase interval in the entire region in the circumferential direction C may be the same third same-phase interval AS3 that is smaller than a different-phase interval, and each different-phase interval in the entire region in the circumferential direction C may be the same third different-phase interval AD3 that is larger than the third same-phase interval AS3. In this case, since a plurality of the same different-phase intervals are provided in the entire region in the circumferential direction C, the attachment portion 8 can be disposed in a part of these different-phase intervals. With this configuration, even if the position of the attachment portion 8 is limited due to, e.g., manufacturing or assembly constraints, a position that is not affected by the constraints can be selected from the plurality of third different-phase intervals AD3, and the attachment portion 8 can be disposed at the selected position.

(12) The seventh embodiment is described with respect to an example in which the attachment portion 8 is disposed so as to have a portion located at the same position in the radial direction R as the bonded ends 48. However, the present disclosure is not limited to this configuration. For example, as shown in FIG. 1, the attachment portion 8 may be disposed at a position outside the bonded ends 48 in the radial direction R.

Figure 19:
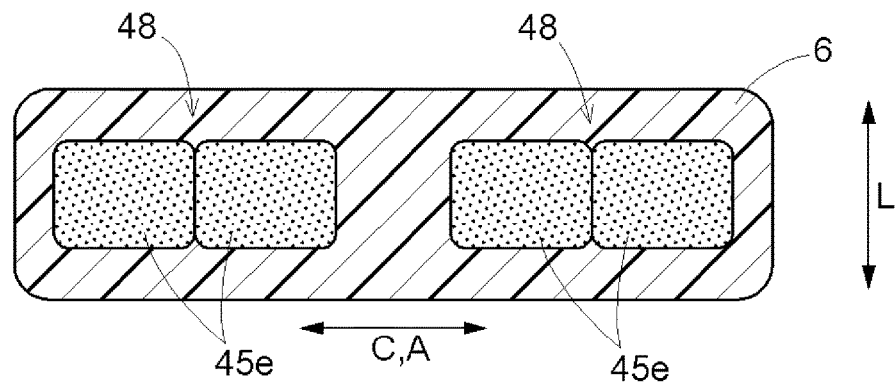
FIG. 19 is a sectional view of bonded ends according to a yet further embodiment.

(13) As shown in FIG. 14, the seventh embodiment is described with respect to an example in which a pair of ends 45e are stacked in the axial direction L and bonded together to form a bonded end 48. However, the present disclosure is not limited to this configuration. For example, as shown in FIG. 19, a pair of ends 45e may be stacked in the circumferential direction C and may be bonded together to form a bonded end 48. This configuration restrains an increase in overall length in the axial direction L of the stator 1 as compared to the case where a pair of ends 45e are stacked in the axial direction L.

The configurations disclosed in each of the above embodiments (including each of the embodiments and other embodiments described above; the same applies to the following description) may be combined with the configurations disclosed in other embodiments unless inconsistency arises.

It should be understood that, regarding other configurations as well, the embodiments disclosed in the specification are by way of example only in all respects. Accordingly, those skilled in the art may make various modifications as appropriate without departing from the spirit and scope of the present disclosure.

SUMMARY OF EMBODIMENTS

Based on the above description, a stator for a rotating electrical machine according to the present disclosure preferably includes the following configurations.

[1]

A stator (1) for a rotating electrical machine which includes a tubular core (3) having a plurality of slots (33) and a coil (4) mounted in the core (3). The coil (4) includes a plurality of conductor wire portions (34) aligned in the slots (33). Each of the conductor wire portions (34) has ends (45e) projecting beyond the slot (33). A pair of the ends (45e) are bonded together to form a bonded end (48). A plurality of the bonded ends (48) are arranged next to each other in a circumferential direction of the core (3) and are arranged in a radial pattern so as to extend in a radial direction (R) of the core (3). A cap member (6) is formed by molding using a resin material having electrical insulation properties so that the cap member (6) integrally covers adjacent ones of the plurality of bonded ends (48).

With this configuration, the cap member (6) that integrally covers adjacent ones of the plurality of bonded ends (48) is formed by using a molding technique that less requires a pretreatment as compared to powder coating etc. Accordingly, electrical insulation between the adjacent ones of the bonded ends (48) can be easily ensured. The plurality of bonded ends (48) are arranged in a radial pattern so as to extend in the radial direction (R) of the core (3). This can reduce the overall axial length of the stator (1) for the rotating electrical machine as compared to the case where the bonded ends (48) are formed so as to extend in an axial direction (L) of the core (3). Moreover, since an interval between a pair of the bonded ends (48) gradually increases as they extend farther from their base ends and closer to their distal ends, a resistance force is caused which is against a radial pullout force that is applied to the cap member (6) integrally covering the pair of bonded ends (48). The cap member (6) can therefore be prevented from coming off from the bonded ends (48) even if, e.g., the stator (1) for the rotating electrical machine is subjected to vibration etc. Electrical insulation between the adjacent ones of the bonded ends (48) can thus be appropriately maintained for a long period of time even in environments where the stator is subjected to vibration etc.

[2]

The coil (4) includes a plurality of phase coils (7) through which alternating currents of a plurality of phases flow, the alternating currents have respective phases that are different from each other, and the cap member (6) is formed so as to integrally cover a plurality of the bonded ends (48) of the phase coils (7) of the same phase.

The phase coils (7) of the same phase have a smaller potential difference from each other as compared to the phase coils (7) of different phases. With this configuration, since the cap member (6) covers the bonded ends (48) of the phase coils (7) of the same phase, problems such as a short circuit are less likely to occur even if a void or voids are present in the cap member (6).

[3]

An interval in the circumferential direction (C) between adjacent ones of the plurality of bonded ends (48) of the phase coils (7) of the same phase is smaller than an interval in the circumferential direction (C) between adjacent ones of a plurality of the bonded ends (48) of the phase coils (7) of different phases at least in a region in the circumferential direction (C).

As described above, the phase coils (7) of the same phase have a smaller potential difference from each other as compared to the phase coils (7) of different phases. With this configuration, since the interval in the circumferential direction (C) between the phase coils (7) of the same phase having a smaller potential difference is small and the interval in the circumferential direction (C) between the phase coils (7) of the different phases having a larger potential difference is large, the bonded ends (48) of each phase coil (7) can be accommodated in the minimum region in the circumferential direction (C) while leaving an appropriate space therebetween for ensuring electrical insulation according to the potential difference. Accordingly, the size of a coil end portion of the stator (1) can be reduced, and a region in the circumferential direction (C) where none of the bonded ends (48) of the phase coils (7) is disposed can be provided so that other structures can be disposed in the region.

[4]

In the above configuration in which the interval in the circumferential direction (C) between adjacent ones of the plurality of bonded ends (48) of the phase coils (7) of the same phase is smaller than the interval in the circumferential direction (C) between adjacent ones of the plurality of bonded ends (48) of the phase coils (7) of the different phases, the core (3) has an attachment portion (8) through which the core (3) is attached to another member, and the attachment portion (8) is disposed between the adjacent ones of the plurality of bonded ends (48) of the phase coils (7) of the different phases as viewed in the axial direction (L) of the core (3).

With this configuration, the attachment portion (8) through which the core (3) is attached to another member can be disposed by making effective use of the relatively large interval in the circumferential direction (C) between the adjacent ones of the plurality of bonded ends (48) of the phase coils (7) of the different phases. Accordingly, the attachment portion (8) can be provided in the core (3) and an increase in size of the stator (1) which is caused by providing the attachment portion (8) can be restrained.

[5]

The cap member (6) has a groove (62) having a portion sandwiched between a pair of adjacent ones of the bonded ends (48).

With this configuration, since the surface of the cap member (6) is bent along the groove (62), a large creepage distance along the surface of the cap member (6) can be ensured between the pair of adjacent ones of the bonded ends (48). Accordingly, even if a void or voids are created between each of the paired bonded ends (48) and the groove (62), a large creepage distance can be ensured between the pair of bonded ends (48). Electrical insulation between the pair of bonded ends (48) can thus be appropriately ensured. That is, the use of the molding technique and the above design of the shape of the cap member (6) allow electrical insulation between adjacent ones of the bonded ends (48) to be easily and appropriately ensured.

[6]

The groove (62) is formed so as to overlap the entire bonded ends (48) as viewed in a direction in which the pair of bonded ends (48) are arranged.

With this configuration, the groove (62) is formed so as to completely separate the pair of bonded ends (48) from each other. This can reduce the risk of creation of any void connecting the pair of bonded ends (48). Moreover, the presence of the groove (62) having a greater depth can ensure a larger creepage distance. Accordingly, even if a void or voids are created between each of the paired bonded ends (48) and the groove (62), the risk of a short circuit between the pair of bonded ends (48) can further be reduced.

[7]

An insulating member (65) that is a separate member from the cap member (6) is fixedly held in the groove (62).

With this configuration, the presence of the insulating member (65) fixedly held in the groove (62) can reliably avoid the risk that the pair of bonded ends (48) may be connected by a void or voids. Electrical insulation between adjacent ones of the bonded ends (48) can thus be more easily and more appropriately ensured.

The stator for a rotating electrical machine according to the present disclosure needs only to have at least one of the effects described above.

The invention claimed is:

1. A stator for a rotating electrical machine, the stator comprising:
   a tubular core having a plurality of slots; and
   a coil mounted in the core, wherein
      the coil includes a plurality of conductor wires aligned in the slots,
      each of the conductor wires has ends projecting beyond the slot,
      a pair of the ends are bonded together to form a bonded end,
      a plurality of the bonded ends are arranged next to each other in a circumferential direction of the core and are arranged in a radial pattern so as to extend in a radial direction of the core,
      a cap is formed by molding using a resin material having electrical insulation properties so that the cap integrally covers adjacent ones of the plurality of bonded ends,
      the coil includes a plurality of phase coils through which alternating currents of a plurality of phases flow, the alternating currents have respective phases that are different from each other,
      the cap is formed so as to integrally cover a plurality of the bonded ends of the phase coils of the same phase, and
      an interval in the circumferential direction between adjacent ones of the plurality of bonded ends of the phase coils of the same phase is smaller than an interval in the circumferential direction between adjacent ones of a plurality of the bonded ends of the phase coils of different phases at least in a region in the circumferential direction.

2. The stator for the rotating electrical machine according to claim 1, wherein
   the core has an attachment through which the core is attached to another member, and
   the attachment is disposed between the adjacent ones of the plurality of bonded ends of the phase coils of the different phases as viewed in an axial direction of the core.

3. The stator for the rotating electrical machine according to claim 2, wherein
   the cap has a groove having a portion sandwiched between a pair of adjacent ones of the bonded ends.

4. The stator for the rotating electrical machine according to claim 3, wherein
   the groove is formed so as to overlap the entire bonded ends as viewed in a direction in which the pair of bonded ends are arranged.

5. The stator for the rotating electrical machine according to claim 4, wherein
   an insulator that is a separate member from the cap is fixedly held in the groove.

6. The stator for the rotating electrical machine according to claim 1, wherein
   the cap has a groove having a portion sandwiched between a pair of adjacent ones of the bonded ends.

7. The stator for the rotating electrical machine according to claim 6, wherein
   the groove is formed so as to overlap the entire bonded ends as viewed in a direction in which the pair of bonded ends are arranged.

8. The stator for the rotating electrical machine according to claim 7, wherein
   an insulator that is a separate member from the cap is fixedly held in the groove.

* * * * *